(12) United States Patent
Dermott et al.

(10) Patent No.: US 7,076,012 B2
(45) Date of Patent: Jul. 11, 2006

(54) MEASURE-CONTROLLED DELAY CIRCUIT WITH REDUCED PLAYBACK ERROR

(75) Inventors: Ross E. Dermott, Boise, ID (US); Tyler J. Gomm, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 743 days.

(21) Appl. No.: 10/230,733

(22) Filed: Aug. 29, 2002

(65) Prior Publication Data

US 2004/0044918 A1    Mar. 4, 2004

(51) Int. Cl.
*H04L 7/00* (2006.01)
*H04L 7/02* (2006.01)

(52) U.S. Cl. .................. 375/354; 375/359
(58) Field of Classification Search ............. 375/354, 375/359, 376, 357; 713/401
See application file for complete search history.

(56) References Cited

U.S. PATENT DOCUMENTS

| | | | |
|---|---|---|---|
| 6,198,326 B1 * | 3/2001 | Choi et al. ............... | 327/263 |
| 6,930,525 B1 * | 8/2005 | Lin et al. ................. | 327/161 |
| 2004/0039955 A1 * | 2/2004 | Gomm .................... | 713/401 |
| 2004/0041606 A1 * | 3/2004 | Kirsch ..................... | 327/161 |

* cited by examiner

*Primary Examiner*—Khai Tran
(74) *Attorney, Agent, or Firm*—Williams, Morgan & Amerson

(57) ABSTRACT

A timing control circuit for synchronizing an output clock signal with an input clock signal includes a pulse generator, a measure delay array, a measure circuit, and a forward delay array. The pulse generator is configured to receive a delay clock signal generated based on the input clock signal and generate a pulse, the pulse having a falling edge corresponding to a rising edge of the delay clock signal. The measure delay array is coupled to the pulse generator to receive the pulse. The measure circuit is configured to determine a position of the pulse within the measure delay array corresponding to a rising edge of the input clock signal. The forward delay array is configured to receive the input clock signal and delay the input clock signal based on the position determined by the measure circuit to generate the output clock signal. A method for synchronizing an output clock signal with an input clock signal includes receiving a delay clock signal generated based on the input clock signal. A pulse is generated having a falling edge corresponding to a rising edge of the delay clock signal. The pulse is propagated through a measure delay array. A position of the pulse within the measure delay array corresponding to a rising edge of the input clock signal is determined. The input clock signal is delayed based on the position determined by the measure circuit to generate the output clock signal.

54 Claims, 7 Drawing Sheets

MEASURE-CONTROLLED DELAY CIRCUIT WITH REDUCED PLAYBACK ERROR

BACKGROUND OF THE INVENTION

1. Field of the Invention

This invention relates generally to the field of semiconductor device timing synchronization and, more particularly, to a measure-controlled delay circuit with reduced playback error.

2. Description of the Related Art

Many high speed electronic systems possess critical timing requirements that dictate a need to generate a periodic clock waveform possessing a precise timing relationship with respect to some reference signal. The improved performance of computing integrated circuits and the growing trend to include several computing devices on the same board present a challenge with respect to synchronizing the time frames of all the components.

While the operation of all components in the system should be highly synchronized, i.e., the maximum skew in time between significant edges of the internally generated clocks of all the components should be minimized, it is not enough to feed the external clock of the system to all the components. This is because different chips may have different manufacturing parameters, which, when taken together with additional factors such as ambient temperature, voltage, and processing variations, may lead to large differences in the phases of the respective chip generated clocks.

Conventionally, synchronization is achieved by using a timing circuit, such as a digital delay locked loop (DDLL) circuit, to detect the phase difference between clock signals of the same frequency and produce a digital signal related to the phase difference. DDLL circuits typically require a relatively large number of clock cycles to synchronize. As a result of this significant lock period, DDLL circuits are not typically disabled after a lock is achieved to conserve power. DDLL circuits are also not well suited to handle large temperature or voltage shifts due to their slow response time. Instead of a DLL circuit, an open-loop topology may be used, such as a measure-controlled delay (MCD) circuit, where a timing measurement directly controls a variable delay. MCD circuits exhibit a fast lock capability (e.g., within 1–4 clock cycles after initialization). However, one drawback of such circuits is noise sensitivity, which may result in considerable jitter due to process, voltage, and temperature (PVT) variations.

One inherent problem associated with current MCD implementations is playback error. FIG. 1 illustrates a conventional MCD circuit 100. The MCD circuit 100 includes a measure delay array 110, a measure circuit 120, and a forward delay array 130. An external clock signal is provided to a buffer circuit 140, which is coupled to a delay monitor 150. The buffer circuit 140 represents the input circuitry of the device. It may include one or more buffers and/or other logic circuitry. The delay monitor 150 models the delay introduced into the external clock signal by the buffer circuit 140 and the delay introduced by the output circuitry. The clock signal exiting the delay monitor 150 thus approximates the actual output clock of the digital device if no clock synchronization circuitry were present. The external clock signal is also provided to the measure circuit 120 and the forward delay array 130.

The delay monitor 150 is coupled to a pulse generator 160. The pulse generator 160 is coupled to the measure delay array 110. Each rising edge of the clock signal entering the pulse generator 160 (e.g., simulated output clock signal) is converted to a narrow pulse (e.g., ~800 ps wide) for propagation through the measure delay array 110. The pulse propagates through the measure delay array 110 until the measure circuit 120 is triggered. The measure circuit 120 includes a series of latches (not shown) that are triggered by the external clock signal. The particular latches triggered are those that correspond to the position of the pulse in the measure delay array 110 (i.e., as represented by "1"). As currently implemented, the entry point to the forward delay array 130 is the leftmost latch in the measure circuit 120 that was triggered. The number of triggered latches is determined by the unit propagation delay in the measure delay array 110 and the width of the pulse generated by the pulse generator 160.

Hence, there is an offset between the rising edge of the pulse that corresponds to the rising edge of the simulated output clock signal and the position that is locked into the forward delay array 130 (i.e., corresponding to the falling edge of the pulse). This misregistration is referred to as playback error. The playback error roughly corresponds to the width of the pulse that was propagated through the measure delay array 110.

Typical techniques for reducing playback error involve tuning out the playback error with static delay elements. The use of static delay elements assumes that the playback error will be constant across all PVT variations. This assumption becomes important as the sensitivity of the device to playback error increases. Certain MCD implementations require complete correspondence between the measurement and playback timing. In such cases, the use of static delay elements to tune out the playback error introduces instability into the system.

One such sensitive MCD implementation involves using a DDLL and an MCD circuit in combination. The MCD generates an initial measurement, and the DDLL takes over to maintain the lock and track variations over time. The dynamic range of the delay line (e.g., eight stages) used in the DDLL circuit is reduced, i.e., as compared to a standalone DDLL circuit. If the playback error is large compared to the width of the shortened delay line used in the DDLL, the circuit may fail to initialize and function.

The present invention is directed to overcoming, or at least reducing the effects of, one or more of the problems set forth above.

SUMMARY OF THE INVENTION

One aspect of the present invention is seen in a timing control circuit for synchronizing an output clock signal with an input clock signal. The timing control circuit includes a pulse generator, a measure delay array, a measure circuit, and a forward delay array. The pulse generator is configured to receive a delay clock signal generated based on the input clock signal and generate a pulse, the pulse having a falling edge corresponding to a rising edge of the delay clock signal. The measure delay array is coupled to the pulse generator to receive the pulse. The measure circuit is configured to determine a position of the pulse within the measure delay array corresponding to a rising edge of the input clock signal. The forward delay array is configured to receive the input clock signal and delay the input clock signal based on the position determined by the measure circuit to generate the output clock signal.

Another aspect of the present invention is seen in a method for synchronizing an output clock signal with an input clock signal. The method includes receiving a delay clock signal generated based on the input clock signal. A pulse is generated having a falling edge corresponding to a rising edge of the delay clock signal. The pulse is propagated through a measure delay array. A position of the pulse within the measure delay array corresponding to a rising edge of the input clock signal is determined. The input clock signal is delayed based on the position determined by the measure circuit to generate the output clock signal.

BRIEF DESCRIPTION OF THE DRAWINGS

The invention may be understood by reference to the following description taken in conjunction with the accompanying drawings, in which like reference numerals identify like elements, and in which.

Figure 1:
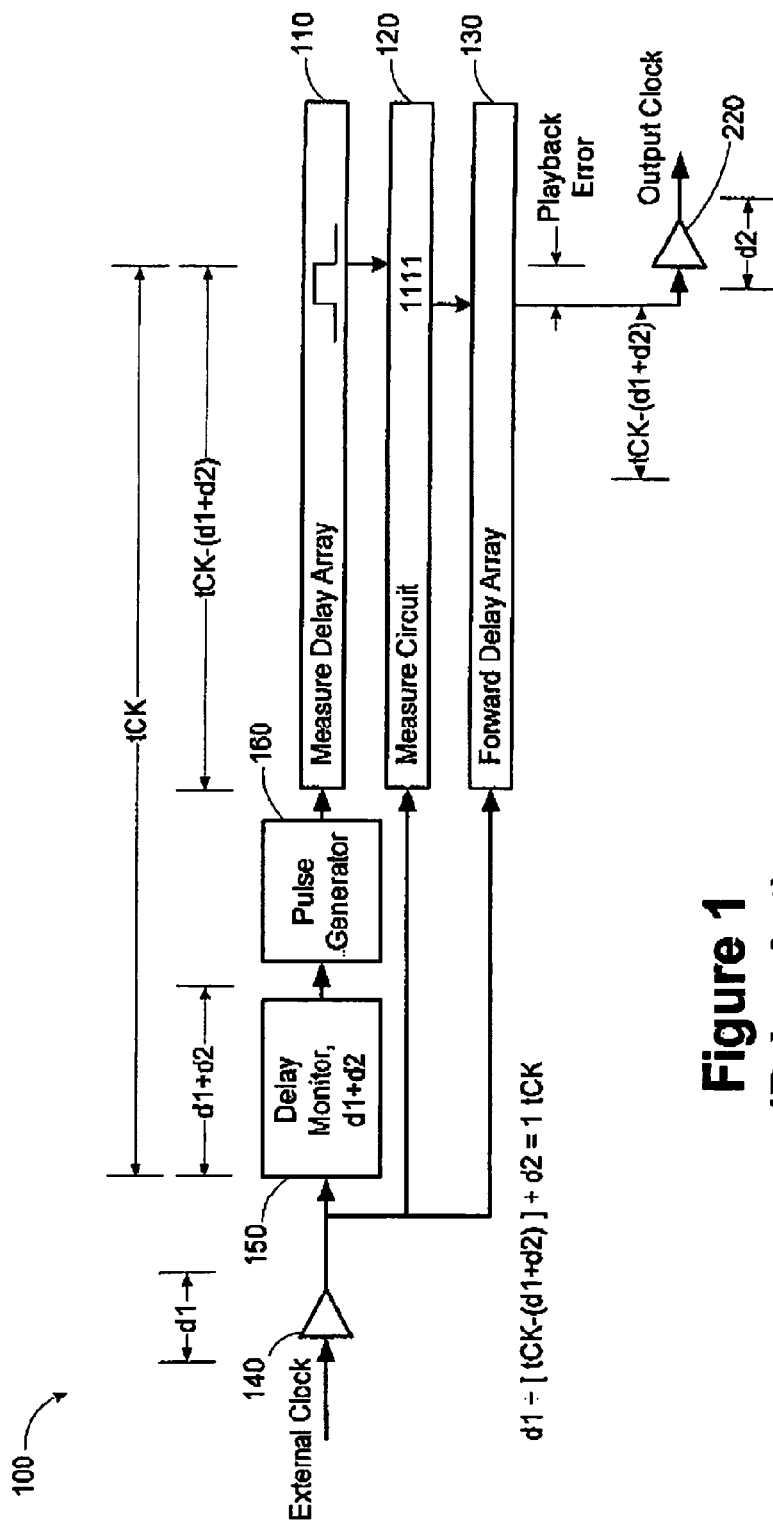
FIG. 1 is a simplified block diagram of a prior art measure-controlled delay circuit.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
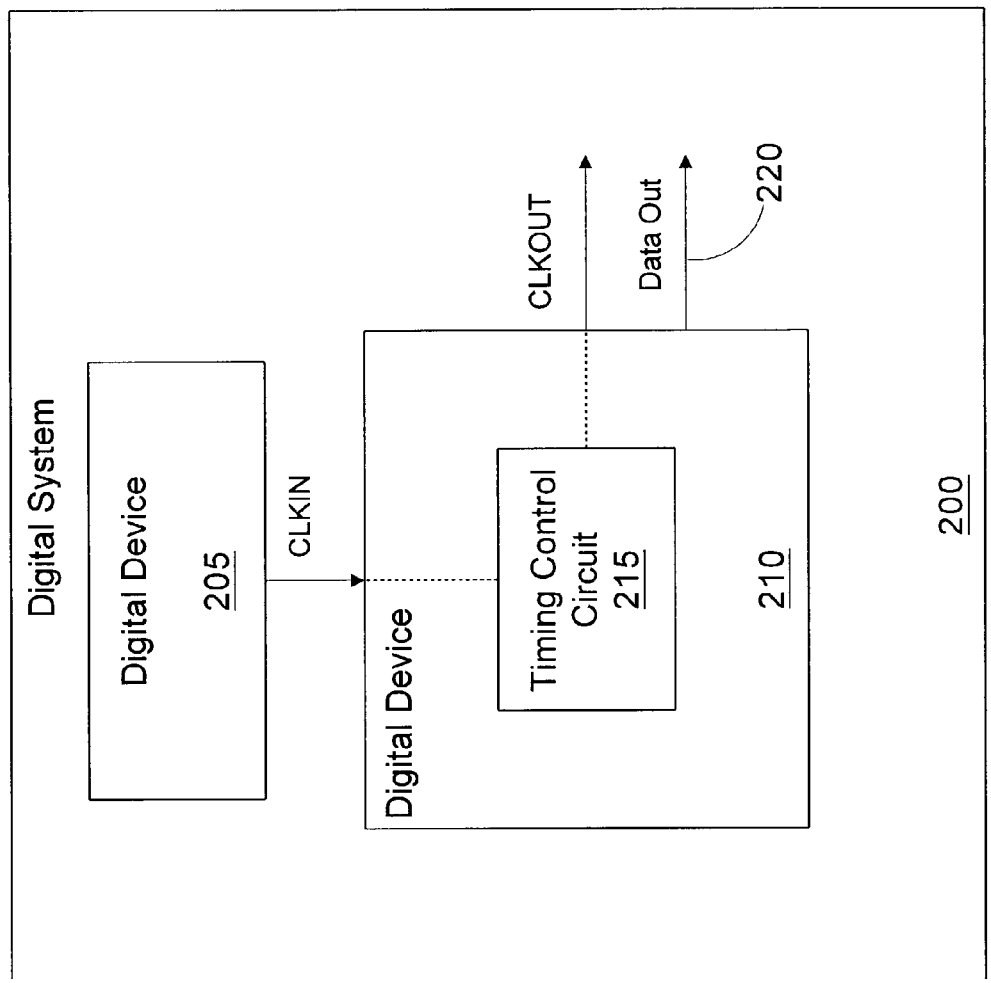
FIG. 2 is a simplified block diagram of a digital system having a timing control circuit in accordance with the present invention.

Referring now to FIG. 2, a simplified block diagram of a digital system 200 is provided. The digital system 200 includes a first digital device 205 coupled to a second digital device 210. The first digital device 205 provides a reference clock signal (CLKIN) to the second digital device 210. The second digital device 210 uses the CLKIN signal to synchronize its internal clocks using a timing control circuit 215 and generate an output clock signal (CLKOUT). As an illustrative example, the first digital device 205 may be a microprocessor and the second digital device 210 may be a memory device that synchronizes its output data on a data line 220 with the CLKOUT signal.

Figure 3:
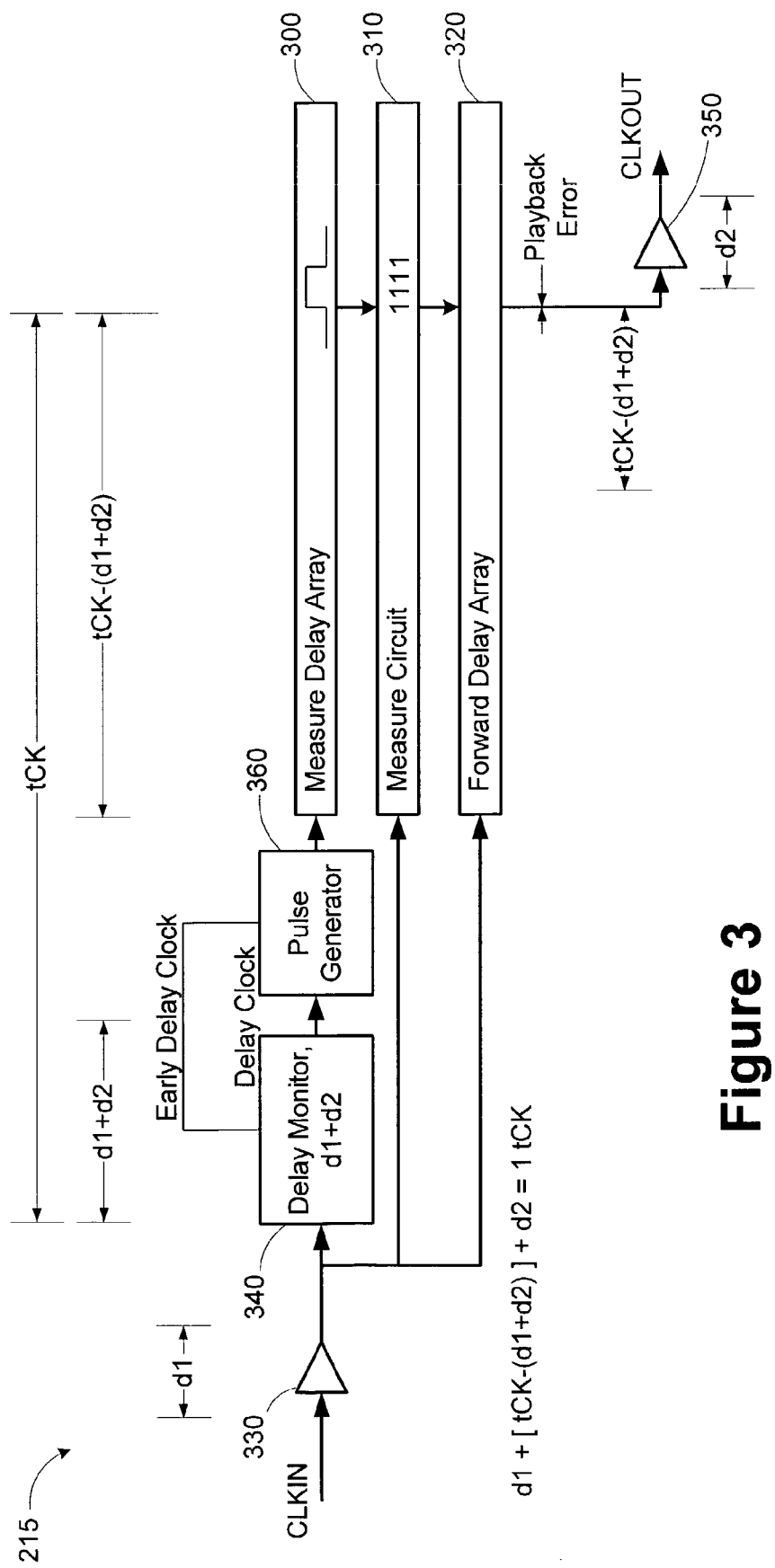
FIG. 3 is simplified block diagram of the timing control circuit of FIG. 2.

Turning now to FIG. 3, a simplified block diagram of the timing control circuit 215 in accordance with one illustrative embodiment of the present invention is illustrated. The timing control circuit 215 includes a measure delay array 300, a measure circuit 310, and a forward delay array 320. An input clock signal (CLKIN) is provided to a buffer circuit 330, which is coupled to a delay monitor 340. The buffer circuit 330 represents the input circuitry of the second digital device 210. It may include one or more buffers and/or other logic circuitry. The input clock signal is also provided to the measure circuit 310 and the forward delay array 320. The output of the forward delay array is provided to a buffer circuit 350. The buffer circuit 350 represents the output circuitry of the second digital device 210. It may include one or more buffers and/or other logic circuitry. The output of the buffer circuit 350 is the output clock signal (CLKOUT) used by the second digital device 210 (see FIG. 2). The delay monitor 340 models the delay introduced into the input clock signal by the buffer circuit 330 (d1) and the output circuitry of the second digital device 210 (d2) (e.g., the buffer circuit 350) to generate a delay clock signal.

The delay monitor 340 is coupled to a pulse generator 360. The pulse generator 360 is coupled to the measure delay array 300. The pulse generator 360 generates a pulse based on the entering delay clock signal (e.g., simulated output clock signal). The pulse is timed such that the falling edge of the pulse coincides with the rising edge of the delay clock signal. The technique used by the pulse generator 360 to generate the pulse with this timing arrangement is discussed in greater detail below. In the illustrated embodiment, the width of the pulse is about ⅙ the width of the cycle time (tCK) for the delay clock signal, however, the pulse width may vary depending on the particular implementation.

The pulse generated by the pulse generator 360 propagates through the measure delay array 300 until the measure circuit 310 is triggered. The measure circuit 310 includes a series of latches (not shown) that are triggered by the reference clock signal. The particular latches triggered are those that correspond to the position of the pulse in the measure delay array 300. The entry point to the forward delay array 320 is the leftmost latch in the measure circuit 310 that was triggered. Because the falling edge of the pulse corresponds to the rising edge of the incoming clock signal, the leftmost latch substantially lines up with the correct rising edge timing. Hence, the playback error is substantially zero.

Figure 4:
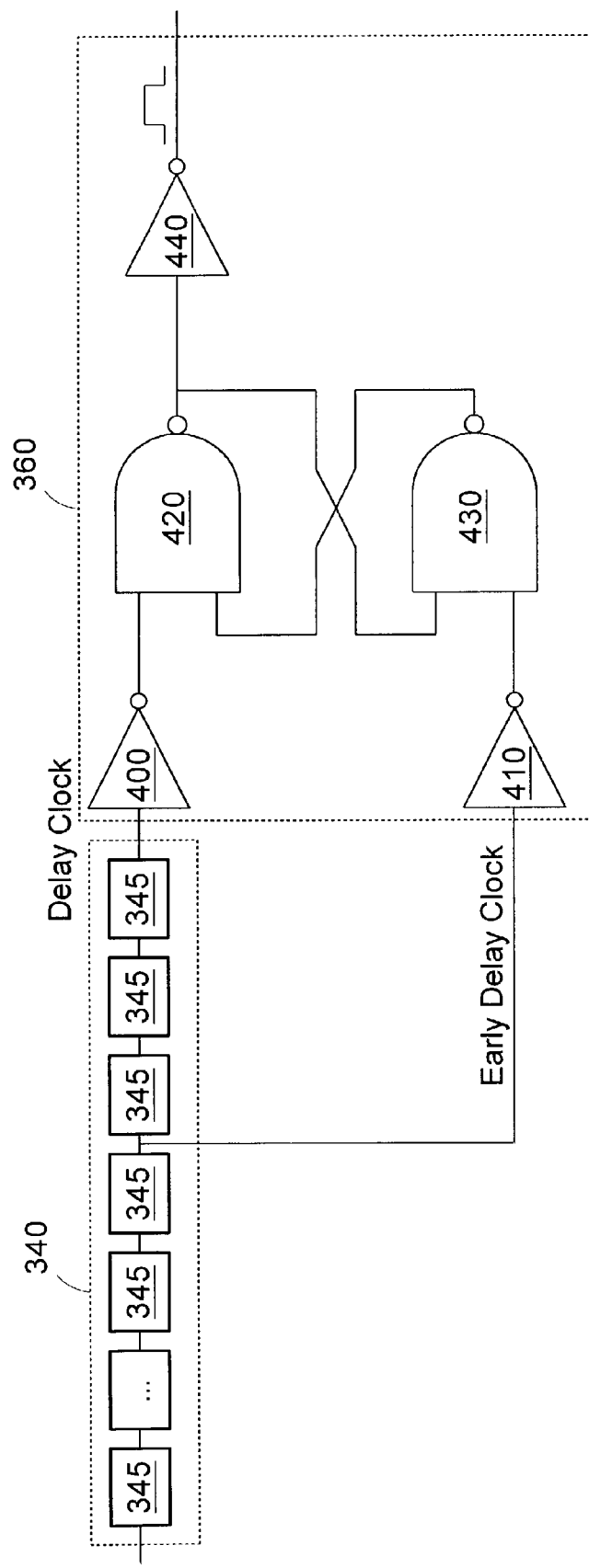
FIG. 4 is a simplified block diagram of a pulse generator used in the timing control circuit of FIG. 3.
Figure 5:
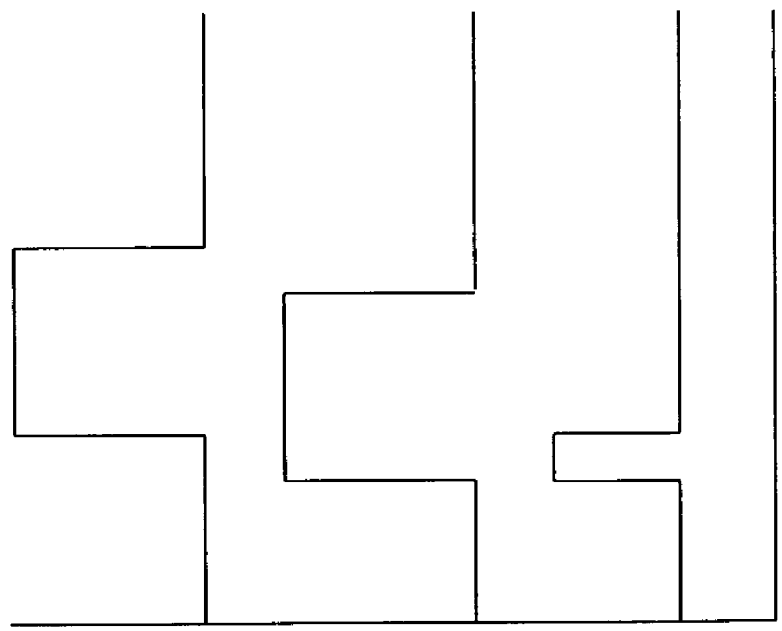
FIG. 5 is a timing diagram illustrating the operation of the pulse generator of FIG. 4.

Turning now to FIG. 4, a simplified block diagram of a pulse generator 360 interfacing with the delay monitor 340 is shown. Although the pulse generator 360 is shown implemented using NAND logic, the application of the present invention is not limited to a particular logic topology. Other topologies, such as NOR logic, data latches, etc., may be used without departing from the spirit and scope of the instant invention. A timing diagram illustrating the timing of the pulse generator 360 is shown in FIG. 5. The operation of the pulse generator 360 is described with simultaneous reference to FIGS. 4 and 5. The pulse generator 360 receives the delay clock signal from the output terminal of the delay monitor 340. The delay monitor 340 includes a plurality of delay stages 345 (e.g., buffers, inverters, gates) to model the delay of the input and output path (d1+d2). The pulse generator 360 also receives an early delay clock signal generated by connecting into the delay monitor 340 prior to its final stage. The particular width of the pulse generated by the pulse generator 360 may be varied by connecting at different points in the series of delay stages 345. Again, the width of the pulse is application specific, but in general, the pulse width is less than one-half the cycle time of the delay clock signal.

The pulse generator 360 includes a buffer circuit 400 for receiving the delay clock signal and a buffer circuit 410 for receiving the early delay clock signal. The buffer circuits 400, 410 are connected to NAND gates 420, 430, respectively. The outputs terminals of the NAND gates 420, 430 are coupled back to the input terminals of the opposing NAND gate 420, 430. The output terminal of the NAND gate 420 is also connected to a buffer circuit 440. The pulse is generated at the output terminal of the buffer circuit 440.

When the delayed and early delayed clock signals are deasserted (logic "0"), the inputs of the NAND gates 420, 430 are at a logic "1" (i.e., a non-triggered state). When the rising edge of the early delay clock signal is received at the buffer circuit 410, the NAND gate 430 is triggered (input goes to a logic "0"), which, in turn, triggers the NAND gate 420 (output goes to a logic "0"). The output of the buffer circuit 440 then goes to an asserted state (logic "1"), and the pulse initiates. When the rising edge of the delay clock signal is received by the pulse generator 360 (i.e., after it fully propagates through the delay monitor 340, the NAND gate 420 is deactivated (returns to logic "1"), and the pulse is deasserted. In this manner, the trailing edge of the pulse coincides with the rising edge of the delay clock signal. Hence, the leftmost latch in the measure circuit 310 activated by the pulse also corresponds to the rising edge of the delay clock signal. Again, due to this alignment, the playback error is substantially zero.

Figure 6:
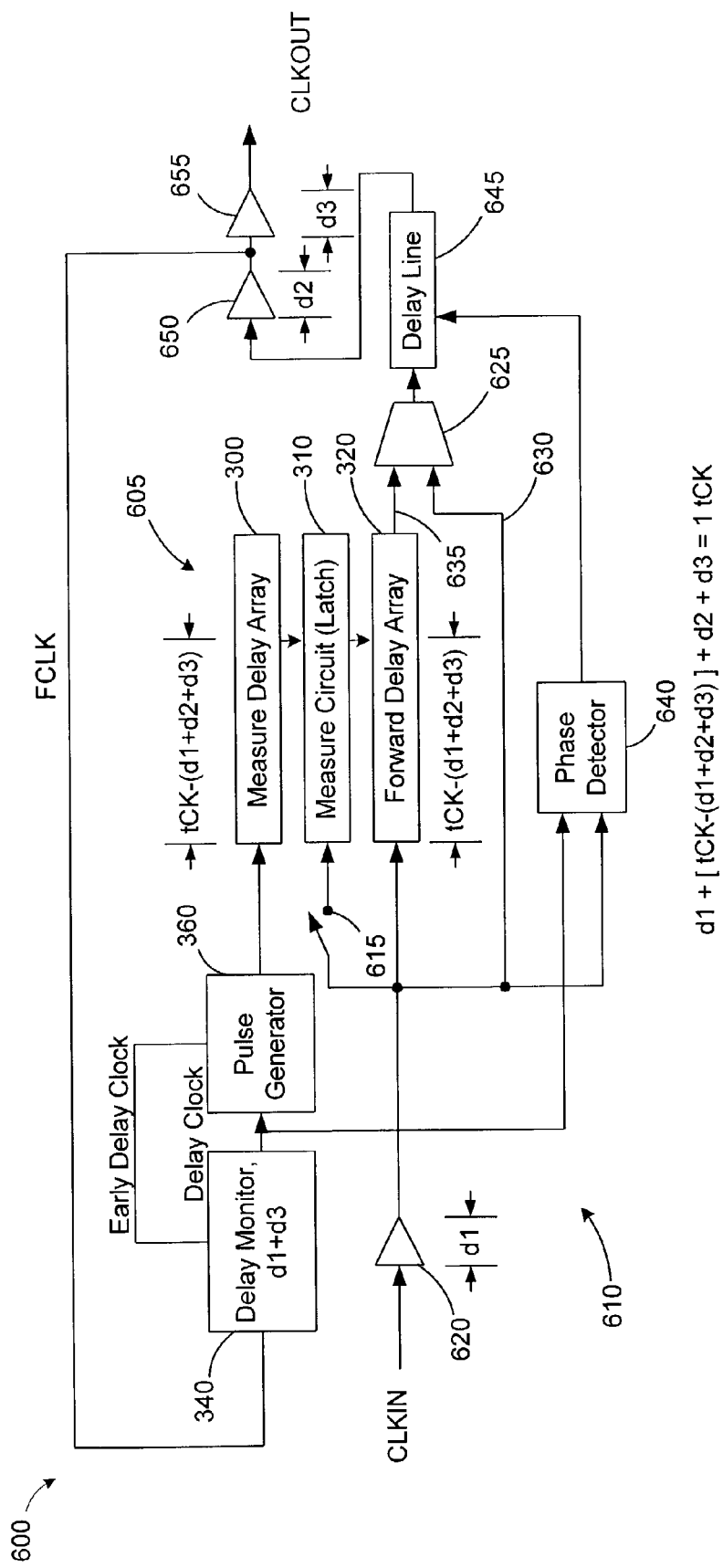
FIG. 6 is a simplified block diagram of an alternative embodiment of the timing control circuit of FIG. 2.

Turning now to FIG. 6, a simplified block diagram of an alternative timing control circuit 600 is provided. The MCD portion 605 of the timing control circuit 600 is the same as that of the timing control circuit 215 illustrated in FIG. 2, and it operates as described above. The timing control circuit 600 includes an additional DDLL portion 610 that takes over after the MCD portion 605 initially measures the clock skew and maintains lock during subsequent operation. The timing control circuit 600 includes a switch 615 (e.g., transistor) that is closed during the initial MCD measurement (i.e., measurement mode) and open during the DDLL tracking (i.e., tracking mode). The input clock signal (CLKIN) is received by a buffer circuit 620 (i.e., the input circuitry), and then routed to the switch 615, the forward delay array 320, and a multiplexer 625. The switch 615 is coupled to the measure circuit 310 such that the CLKIN signal is provided to the measure circuit when the switch 615 is closed. Also, during the MCD measurement period (i.e., when the switch 615 is closed), the multiplexer 625 selects the lower path 630. During the DDLL tracking period, the multiplexer 625 selects the upper path 635.

The DDLL portion 610 includes a phase detector 640 and a delay line 645. The phase detector 640 measures a phase difference between the CLKIN signal provided by the buffer circuit 620 and the delay clock signal exiting the delay monitor 340. The phase detector 640 controls the amount of delay imposed by the delay line 645 responsive to the measured phase difference. The signal exiting the delay line 645 is received by a buffer circuit 650. The buffer circuit 650 represents the data path of the internal circuitry (i.e., data path from memory array) of the second digital device 210. It may include one or more buffers and/or other logic circuitry. The output of the buffer circuit 650 is provided to the delay monitor 340. Because the output of the buffer circuit 650 is fed to the delay monitor 340, its delay (d2) need not be modeled by the delay monitor 340. The buffer circuit 650 is also coupled to another buffer circuit 655. The buffer circuit 655 represents the output circuitry (i.e., output drivers, slew rate control devices, etc.) of the second digital device 210. It may include one or more buffers and/or other logic circuitry. The output of the buffer circuit 655 represents the output clock signal (CLKOUT) used by the digital device 210 (see FIG. 1).

Because the playback error generated by the MCD portion 605 is substantially zero, the stability of the timing control circuit 600 is increased. Hence, the timing control circuit 600 is better able to initialize and track the clock skew.

Figure 7:
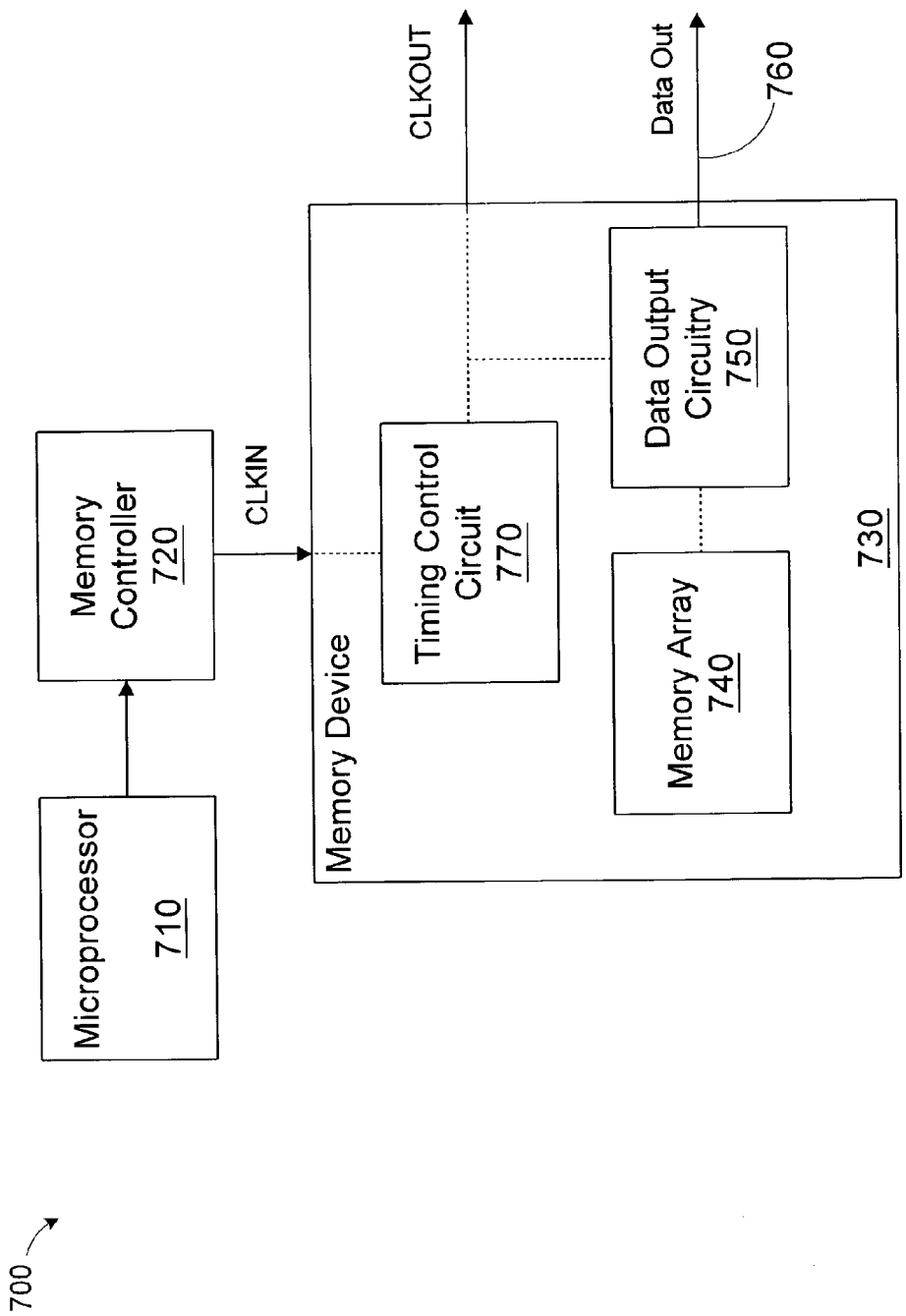
FIG. 7 is a simplified block diagram of a computer system including a timing control circuit in accordance with another illustrative embodiment of the present invention.

Referring to FIG. 7, a simplified block diagram of a computer system 700 incorporating the present invention is shown. The computer system 700 includes a microprocessor 710 coupled to a memory controller 720. The memory controller 720 is coupled to a memory device 730. The microprocessor issues commands to the memory controller 720 to access data stored in the memory device 730. The memory device includes a memory array 740 for storing data and data output circuitry 750 for outputting data read from the memory array 740 on a data output path 760. The memory controller 720 provides the input clock signal (CLKIN) to the memory device 730. The memory device 730 includes a timing control circuit 770, such as the timing control circuit 215 of FIG. 3 or the timing control circuit 600 of FIG. 6. The timing control circuit 770 receives the input clock signal and generates the output clock signal (CLKOUT) for clocking the data output circuitry 750. For clarity and to avoid obscuring the instant invention, only those interconnections and modules related to the control of the timing in the memory device 730 are illustrated. The microprocessor 710, memory controller 720, and memory device 730 (i.e., with the exception of the timing control circuit 770) may take on numerous forms, depending on the particular implementation. Those of ordinary skill in the art are knowledgeable regarding the particular construct and operation of these devices.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A timing control circuit for synchronizing an output clock signal with an input clock signal, comprising:
    a pulse generator configured to receive a delay clock signal generated based on the input clock signal and generate a pulse, the pulse having a falling edge corresponding to a rising edge of the delay clock signal;
    a measure delay array coupled to the pulse generator to receive the pulse;
    a measure circuit configured to determine a position of the pulse within the measure delay array corresponding to a rising edge of the input clock signal; and
    a forward delay array configured to receive the input clock signal and delay the input clock signal based on the position determined by the measure circuit to generate the output clock signal.

2. The circuit of claim 1, wherein the pulse generator is configured to receive an early delay clock signal generated based on the input clock signal, the early delay clock signal having a rising edge occurring prior to the rising edge of the delay clock signal, and the pulse generator being able to generate the rising edge of the pulse responsive to receiving the rising edge of the early delay clock signal.

3. The circuit of claim 1, further comprising a delay model coupled to the pulse generator and configured to receive the input clock signal and delay the input clock signal to generate the delay clock signal.

4. The circuit of claim 3, wherein the delay model includes a plurality of stages and the pulse generator is coupled to an intermediate stage of the delay model, the intermediate stage providing an early delay clock signal.

5. The circuit of claim 4, wherein die pulse generator is configured to generate the rising edge of the pulse responsive to receiving the rising edge of the early delay clock signal.

6. The circuit of claim 5, wherein the pulse generator is configured to generate the falling edge of the pulse responsive to receiving the rising edge of the delay clock signal.

7. The circuit of claim 3, further comprising:
a first buffer circuit coupled to the delay model and configured to receive the input clock signal; and
a second buffer circuit coupled to the forward delay array and configured to receive the output clock signal, wherein the delay model is configured to model delays imposed by the first and second buffer circuits.

8. The circuit of claim 1, further comprising a delay locked loop circuit coupled to the forward delay array.

9. The circuit of claim 8, wherein the delay locked loop circuit further comprises:
a switch configured to receive the input clock signal and coupled to the measure circuit;
a phase detector having input terminals coupled to receive the delay clock signal and the input clock signal and determine a phase difference between the delay clock signal and the input clock signal;
a multiplexer coupled to, receive the input clock signal and the output clock signal; and
a delay line coupled to the multiplexer to receive the one of the input clock signal and the output clock signal selected by the multiplexer the delay line being configured to delay the selected signal by a variable delay controlled by the phase detector based on the phase difference.

10. The circuit of claim 9, wherein the switch is configured to provide the input clock signal to the measure circuit responsive to the timing control circuit during a measurement mode and remove the input clock signal from the measure circuit during a tracking mode.

11. The circuit of claim 10, wherein the multiplexer is configured to provide the input clock signal to the delay line during the measurement mode and provide the output clock signal from the forward delay may during the tracking mode.

12. The circuit of claim 9, further comprising:
a first buffer circuit coupled to the delay line to receive the output clock signal;
a delay model coupled between the buffer circuit and the pulse generator and configured to receive the output clock signal from the buffer circuit and delay the output clock signal to generate the delay clock signal.

13. The circuit of claim 12, further comprising:
a second buffer circuit coupled to receive the input clock signal and provide the input clock signal to the switch, the forward delay array, the multiplexer, and the phase detector; and
a third buffer circuit coupled to the second buffer circuit to receive the output clock signal, wherein the delay monitor is configured to model delays imposed by the second and third buffer circuits.

14. A method for synchronizing an output clock signal with an input clock signal, comprising:
receiving a delay clock signal generated based on the input clock signal;
generating a pulse, the pulse having a falling edge corresponding to a rising edge of the delay clock signal;
propagating the pulse through a measure delay array;
determining a position of the pulse within the measure delay array corresponding to a rising edge of the input clock signal; and
delaying the input clock signal based on the position determined by the measure circuit to generate the output clock signal.

15. The method of claim 14, further comprising:
receiving an early delay clock signal generated based on the input clock signal, the early delay clock signal having a rising edge occurring prior to the rising edge of the delay clock signal; and
generating the rising edge of the pulse responsive to receiving the rising edge of the early delay clock signal.

16. The method of claim 14, further comprising delaying the input clock signal to generate the delay clock signal.

17. The method of claim 16, wherein delaying the input clock signal further comprises providing a plurality of delay stages and propagating the input clock signal through the delay stages, and the method further comprises and coupling to an intermediate stage of the delay model to generate an early delay clock signal.

18. The method of claim 17, wherein generating the pulse further comprises generating the rising edge of the pulse responsive to receiving the rising edge of the early delay clock signal.

19. The method of claim 18, wherein generating the pulse further comprises generating the falling edge of the pulse responsive to receiving the rising edge of the delay clock signal.

20. The method of claim 16, further comprising:
providing a first buffer circuit configured to receive the input clock signal; and
providing a second buffer circuit coupled to the to receive the output clock signal; and
delaying the input clock signal by an amount based on a model of delays imposed by the first and second buffer circuits to generate the delay clock signal.

21. The method of claim 20, further comprising:
determining a phase difference between the delay clock signal and the input clock signal;
selecting one of the input clock signal and the output clock signal; and
delaying the selected signal by a variable delay based on the phase difference.

22. The method of claim 21, further comprising enabling the determining of the position of the pulse within the measure delay array during a measurement mode and disabling the determining of the position of the pulse within the measure delay array during a tracking mode.

23. The method of claim 22, wherein selecting the one of the input clock signal and the output clock signal further comprises selecting the input clock signal during the measurement mode and selecting the output clock signal during the tracking mode.

24. The method of claim 21, further comprising:
providing a first buffer circuit configured to receive the output clock signal;

delaying the output clock signal to generate the delay clock signal.

25. The method of claim 24, further comprising:
providing a second buffer circuit configured to receive the input clock signal;
providing a Third buffer circuit configured to receive the output clock signal from the second buffer circuit; and
delaying the output clock signal by an amount based on a model of delays imposed by the second and third buffer circuits to generate the delay clock signal.

26. A memory device configured to receive an input clock signal, comprising:
a data output path;
a data array;
data output circuitry configured to read data from the data array and provide the data on the data output path using an output clock signal synchronized with the input clock signal; and
a timing control circuit for synchronizing the output clock signal with the input clock signal, the timing control circuit comprising:
a pulse generator configured to receive a delay clock signal generated based on the input clock signal and generate a pulse, the pulse having a falling edge corresponding to a rising edge of the delay clock signal;
a measure delay array coupled to the pulse generator to receive the pulse;
a measure circuit configured to determine a position of the pulse within the measure delay array corresponding to a rising edge of the input clock signal; and
a forward delay array configured to receive the input clock signal and delay the input clock signal based on the position determined by the measure circuit to generate the output clock signal.

27. The memory device of claim 26, wherein the pulse generator is configured to receive an early delay clock signal generated based on the input clock signal, the early delay clock signal having a rising edge occurring prior to the rising edge of the delay clock signal, and the pulse generator being able to generate the rising edge of the pulse responsive to receiving the rising edge of the early delay clock signal.

28. The memory device of claim 26, wherein the timing control circuit further comprises a delay model coupled to the pulse generator and configured to receive the input clock signal and delay the input clock signal to generate the delay clock signal.

29. The memory device of claim 28, wherein the delay model includes a plurality of stages and the pulse generator is coupled to an intermediate stage of the delay model, the intermediate stage providing an early delay clock signal.

30. The memory device of claim 29, wherein the pulse generator is configured to generate the rising edge of the pulse responsive to receiving the rising edge of the early delay clock signal.

31. The memory device of claim 30, wherein the pulse generator is configured to generate the falling edge of the pulse responsive to receiving the rising edge of the delay clock signal.

32. The memory device of claim 28, wherein the timing control circuit further comprises:
a first buffer circuit coupled to the delay model and configured to receive the input clock signal; and
a second buffer circuit coupled to the forward delay array and configured to receive the output clock signal, wherein the delay model is configured to model delays imposed by the first and second buffer circuits.

33. The memory device of claim 26, wherein the timing control circuit further comprises a delay locked loop circuit coupled to the forward delay array.

34. The memory device of claim 33, wherein the delay locked loop circuit further comprises:
a switch configured to receive the input clock signal and coupled to the measure circuit;
a phase detector having input terminals coupled to receive the delay clock signal and the input clock signal end determine a phase difference between the delay clock signal and the input clock signal;
a multiplexer coupled to receive the input clock signal and the output clock signal; and a delay line coupled to the multiplexer to receive the one of the input clock signal and the output clock signal selected by the multiplexer, the delay line being configured to delay the selected signal by a variable delay controlled by the phase detector based on the phase difference.

35. The memory device of claim 34, wherein the switch is configured to provide the input clock signal to the measure circuit responsive to the timing control circuit during a measurement mode and remove the input clock signal from the measure circuit during a tracking mode.

36. The memory device of claim 35, wherein the multiplexer is configured to provide the input clock signal to the delay line during the measurement mode and provide the output clock signal from the forward delay may during the tracking mode.

37. The memory device of claim 34, wherein the timing control circuit further comprises:
a first buffer circuit coupled to the delay line to receive the output clock signal;
a delay model coupled between the buffer circuit and the pulse generator and configured to receive the output clock signal from the buffer circuit and delay the output clock signal to generate the delay clock signal.

38. The memory device of claim 37, wherein the timing control circuit further comprises:
a second buffer circuit coupled to receive the input clock signal and provide the input clock signal to the switch, the forward delay any, the multiplexer, and the phase detector; and
a third buffer circuit coupled to the second buffer circuit to receive the output clock signal, wherein the delay monitor is configured to model delays imposed by the second and third buffer circuits.

39. A computer system, comprising:
a microprocessor;
a memory controller coupled to the memory controller and configured to provide an input clock signal;
a memory device coupled to the memory controller and configured to receive the input clock signal, the memory device comprising:
a data output path;
a data array;
data output circuitry configured to read data from the data array and provide the data on the data output path using an output clock signal synchronized with the input clack signal; and
a timing control circuit for synchronizing the output clock signal with the input clock signal, the timing control circuit comprising:
a pulse generator configured to receive a delay clock signal generated based on thy input clock signal and generate a pulse, the pulse having a falling edge corresponding to a rising edge of the delay clock signal;

a measure delay array coupled to the pulse generator to receive the pulse;

a measure circuit configured to determine a position of the pulse within the measure delay array corresponding to a rising edge of the input clock signal; and a forward delay array configured to receive the input clock signal and delay the input clock signal based on the position determined by the measure circuit to generate the output clock signal.

40. The computer system of claim 39, wherein the pulse generator is configured to receive an early delay clock signal generated based on the input clock signal, the early delay clock signal having a rising edge occurring prior to the rising edge of the delay clock signal, and the pulse generator being able to generate the rising edge of the pulse responsive to receiving the rising edge of the early delay clock signal.

41. The computer system of claim 39, wherein the timing control circuit further comprises a delay model coupled to the pulse generator, and configured to receive the input clock signal and delay the input clock signal to generate the delay clock signal.

42. The computer system of claim 41, wherein the delay model includes a plurality of stages and the pulse generator is coupled to an intermediate stage of The delay model, the intermediate stage providing an early delay clock signal.

43. The computer system of claim 42, wherein The pulse generator is configured to generate the rising edge of the pulse responsive to receiving the rising edge of the early delay clock signal.

44. The computer system of claim 43, wherein the pulse generator is configured to generate the falling edge of the pulse responsive to receiving the rising edge of the delay clock signal.

45. The computer system of claim 41, wherein the liming control circuit further comprises:

a tint buffer circuit coupled to the delay model and configured to receive the input clock signal; and a second buffer circuit coupled to the forward delay array and configured to receive the output clock signal, wherein the delay model is configured to model delays imposed by the first and second buffer circuits.

46. The computer system of claim 39, wherein the timing control circuit further comprises a delay locked loop circuit coupled to the forward delay array.

47. The computer system of claim 46, wherein the delay locked loop circuit further comprises:

a switch configured to receive the input clock signal and coupled to the measure circuit;

a phase detector having input terminals coupled to receive the delay clock signal and the input clock signal and determine a phase difference between the delay clock signal and the input clock signal;

a multiplexer coupled to receive the input clock signal and the output clock signal; and a delay line coupled to the multiplexer to receive the one of the input clock signal and the output clock signal selected by the multiplexer, the delay line being configured to delay the selected signal by a variable delay controlled by the phase detector based on the phase difference.

48. The computer system of claim 47, wherein the switch is configured to provide the input clock signal to the measure circuit responsive to the timing control circuit during a measurement mode and remove the input clock signal from the measure circuit during a tracking mode.

49. The computer system of claim 48, wherein the multiplexer is configured to provide the input clock signal to the delay line during the measurement mode and provide the output clock signal from the forward delay array during the tracking mode.

50. The computer system of claim 47, wherein the timing control circuit further comprises:

a first buffer circuit coupled to the delay line to receive the output clock signal;

a delay model coupled between the buffer circuit and the pulse generator and configured to receive the output clock signal from the buffer circuit and delay the output clock signal to generate the delay clock signal.

51. The computer system of claim 50, wherein the timing control circuit further comprises:

a second buffer circuit coupled to receive the input clock signal and provide the input clock signal to the switch, the forward delay array, the multiplexer, and the phase detector; and a third buffer circuit coupled to the second buffer circuit to receive the output clock signal, wherein the delay monitor is configured to model delays imposed by the second and third buffer circuits.

52. A timing control circuit, comprising:

a first buffer circuit configured to receive an input clock signal;

a delay model configured to receive the input clock signal and delay the input clock signal to generate a delay clock signal;

a pulse generator coupled to the delay model and configured to receive the delay clock signal generate a pulse, the pulse having a falling edge corresponding to a rising edge of the delay clock signal;

a measure delay array coupled to the pulse generator to receive the pulse;

a measure circuit configured to determine a position of the pulse within the measure delay array corresponding to a rising edge of the input clock signal;

a forward delay array configured to receive the input clock signal and delay the input clock signal based on the position determined by the measure circuit to generate an output clock signal; and a second buffer circuit coupled to the forward delay array and configured to receive the output clock signal, wherein the delay model is configured to model delays imposed by the first and second buffer circuits.

53. A timing control circuit, comprising:

a first buffer circuit configured to receive an input clock signal;

a delay model configured to generate a delay clock signal;

a pulse generator coupled to the delay model and configured to receive the delay clock signal generate a pulse, the pulse having a falling edge corresponding to a rising edge of the delay clock signal;

a measure delay array coupled to the pulse generator to receive the pulse;

a measure circuit configured to determine a position of the pulse within the measure delay array corresponding to a rising edge of the input clock signal;

a switch coupled between the first buffer circuit and the measure circuit, the switch being configured to provide the input clock signal to the measure circuit responsive to the timing control circuit during a measurement mode and remove the input clock signal from the measure circuit during a tracking mode;

a forward delay array configured to receive the input clock signal and delay the input clock signal based on the position determined by the measure circuit to generate an output clock signal;

a phase detector having input terminals coupled to the first buffer circuit and the delay monitor and configured to detect a phase difference between the delay clock signal and the input clock signal;

a multiplexer having input terminals coupled to the forward delay array and the first buffer circuit, the multiplexer being configured to select the input clock signal during the measurement mode and select the output clock signal from the forward delay array during the tracking mode;

a delay line coupled to an output terminal of the multiplexer to receive the one of the input clock signal and the output clock signal selected by the multiplexer, the delay line being configured to delay the selected signal by a variable delay controlled by the phase detector based on the phase difference;

a second buffer circuit coupled to the delay line to receive the output clock signal, an output terminal of the second buffer circuit being connected to the delay monitor;

a third buffer circuit coupled to the second buffer circuit to receive the output clock signal, wherein the delay monitor is configured to model delays imposed by the first and third buffer circuits.

54. An apparatus for synchronizing an output clock signal with an input clock signal, comprising:

means for receiving a delay clock signal generated based on the input clock signal;

means for generating a pulse, the pulse having a falling edge corresponding to a rising edge of the delay clock signal;

means for propagating the pulse through a measure delay array;

means for determining a position of the pulse within the measure delay array corresponding to a rising edge of the input clock signal; and means for delaying the input clock signal based on the position determined by the measure circuit to generate the output clock signal.

* * * * *

UNITED STATES PATENT AND TRADEMARK OFFICE
CERTIFICATE OF CORRECTION

PATENT NO. : 7,076,012 B2 Page 1 of 1
APPLICATION NO. : 10/230733
DATED : July 11, 2006
INVENTOR(S) : Ross E. Dermott and Tyler J. Gomm It is certified that error appears in the above-identified patent and that said Letters Patent is hereby corrected as shown below:

In column 7, line 13, delete "die" and insert -- the --;

In column 7, line 53, delete "may" and insert -- array --;

In column 9, line 6, delete "Third" and insert -- third --;

In column 10, line 9, delete "end" and insert -- and --;

In column 10, line 27, delete "may" and insert -- array --;

In column 10, line 41, delete "any" and insert -- array --;

In column 10, line 59, delete "clack" and insert -- clock --;

In column 10, line 64, delete "thy" and insert -- the --;

In column 11, line 25, delete "The" and insert -- the --;

In column 11, line 27, delete "The" and insert -- the --;

In column 11, line 35, delete "liming" and insert -- timing --; and

In column 11, line 37, delete "tint" and insert -- first --;

Signed and Sealed this

Twenty-first Day of November, 2006

JON W. DUDAS
*Director of the United States Patent and Trademark Office*